(12) United States Patent
Kotula

(10) Patent No.: US 10,303,987 B2
(45) Date of Patent: May 28, 2019

(54) SYSTEM AND METHOD FOR PERFORMING PRODUCTION LINE PRODUCT IDENTIFICATION

(71) Applicant: Sensors Incorporated, Delano, MN (US)

(72) Inventor: David J. Kotula, Maple Plain, MN (US)

(73) Assignee: Sensors Incorporated, Delano, MN (US)

( * ) Notice: Subject to any disclaimer, the term of this patent is extended or adjusted under 35 U.S.C. 154(b) by 0 days.

(21) Appl. No.: 15/956,813

(22) Filed: Apr. 19, 2018

(65) Prior Publication Data

US 2018/0314867 A1     Nov. 1, 2018

Related U.S. Application Data

(63) Continuation of application No. 15/498,267, filed on Apr. 26, 2017.

(51) Int. Cl.
*G06K 9/46* (2006.01)
*G06K 9/68* (2006.01)
*G06K 7/10* (2006.01)
*G06K 7/14* (2006.01)
*G06T 7/00* (2017.01)
(Continued)

(52) U.S. Cl.
CPC ....... *G06K 9/6807* (2013.01); *G06K 7/10445* (2013.01); *G06K 7/10722* (2013.01); *G06K 7/10861* (2013.01); *G06K 7/1413* (2013.01); *G06K 9/00201* (2013.01); *G06K 9/20* (2013.01); *G06K 9/46* (2013.01); *G06K 9/4671* (2013.01); *G06K 9/6215* (2013.01); *G06T 7/0004* (2013.01); *G06K 2209/17* (2013.01);
(Continued)

(58) Field of Classification Search
CPC .................................................... G06K 9/6807
See application file for complete search history.

(56) References Cited

U.S. PATENT DOCUMENTS 4,509,081 A * 4/1985 Peyton .................... B07C 5/122
                                                                  250/223 B
6,089,455 A * 7/2000 Yagita .............. G06K 19/06009
                                                                     235/111

(Continued)

OTHER PUBLICATIONS

Non-Final Office Action issued in U.S. Appl. No. 15/498,267 dated Jun. 4, 2018.

*Primary Examiner* — Thomas Randazzo
(74) *Attorney, Agent, or Firm* — Gardella Grace P.A.

(57) ABSTRACT

In an illustrative embodiment, a system for identifying products on a production line includes image capturing devices that acquire images of containers moving along a production line at an inspection location. The system also includes a rejection device and a controller that configures the image capturing devices for image acquisition based on properties of the containers, identifies a product associated with each of the containers based on a portion of a product identification code and a portion of additional features detected in the images, and determines whether the identified product matches predetermined properties or characteristics, resulting in a pass result, otherwise a non-pass result occurs. When a non-pass result occurs, the controller outputs a signal to actuate the rejection device that removes the container from the production line.

20 Claims, 7 Drawing Sheets

(51) Int. Cl.
  *G06K 9/20* (2006.01)
  *G06K 9/00* (2006.01)
  *G06K 9/62* (2006.01)
(52) U.S. Cl.
  CPC ............... *G06T 2207/30164* (2013.01); *G06T 2207/30168* (2013.01)

(56) References Cited

U.S. PATENT DOCUMENTS

| | | | | |
|---|---|---|---|---|
| 6,661,911 B1* | 12/2003 | Ishikura | ................ | B07C 5/3422 198/339.1 |
| 7,602,288 B2* | 10/2009 | Broussard | .......... | G06K 17/0022 235/385 |
| 8,077,051 B2* | 12/2011 | Kotula | ................... | G06Q 10/08 340/500 |
| 8,305,192 B2* | 11/2012 | Connolly | ............. | G06K 7/0008 235/462.2 |
| 9,147,326 B2* | 9/2015 | Kotula | ..................... | G08B 3/10 |
| 9,495,764 B1* | 11/2016 | Boardman | .......... | G06K 9/00201 |
| 9,830,631 B1* | 11/2017 | Dhua | ................... | G06K 9/6202 |
| 2003/0174891 A1* | 9/2003 | Wenzel | ............... | G06K 9/6857 382/209 |
| 2003/0193185 A1* | 10/2003 | Valley | ................. | G06F 19/3462 283/81 |
| 2006/0067572 A1* | 3/2006 | White | ................... | G06K 9/2036 382/152 |
| 2006/0091208 A1* | 5/2006 | He | ....................... | G06Q 10/087 235/385 |
| 2006/0255130 A1* | 11/2006 | Whewell | ................ | G07D 7/004 235/383 |
| 2009/0238442 A1* | 9/2009 | Upham | ............. | G01R 31/2896 382/145 |
| 2011/0314052 A1* | 12/2011 | Francis | ............ | G06F 17/30994 707/769 |
| 2011/0317150 A1* | 12/2011 | Decoux | ............. | G06K 7/10722 356/73 |
| 2013/0135101 A1* | 5/2013 | Kotula | ..................... | G08B 3/10 340/540 |
| 2013/0327828 A1* | 12/2013 | Lawson | ............. | G06K 7/10821 235/440 |
| 2015/0036876 A1* | 2/2015 | Marrion | ............... | G06K 9/2054 382/103 |
| 2015/0248589 A1* | 9/2015 | Broache | ................ | G06Q 10/08 382/182 |
| 2015/0363920 A1* | 12/2015 | Chang | .................... | G06T 5/005 348/241 |
| 2016/0200462 A1* | 7/2016 | Kriheli | .................... | B65B 55/02 700/214 |
| 2016/0231253 A1* | 8/2016 | Nygaard | ................ | G06T 7/0004 |
| 2017/0174439 A1* | 6/2017 | Ripley | ................... | B65G 43/08 |
| 2017/0174440 A1* | 6/2017 | Ripley | ................. | B07C 5/3412 |
| 2017/0200115 A1* | 7/2017 | High | .................... | G01C 21/343 |
| 2017/0316558 A1* | 11/2017 | Hori | ......................... | G06T 7/001 |
| 2017/0330135 A1* | 11/2017 | Taylor | ............... | G06K 7/10297 |
| 2018/0025252 A1* | 1/2018 | Konishi | ............... | G06K 9/4609 382/216 |
| 2018/0032951 A1* | 2/2018 | Chanez | ........... | G06Q 10/0833 |
| 2018/0060525 A1* | 3/2018 | Chen | ........................ | A61J 1/03 |
| 2018/0137344 A1* | 5/2018 | Kusakabe | .......... | G06K 9/00234 |

* cited by examiner

SYSTEM AND METHOD FOR PERFORMING PRODUCTION LINE PRODUCT IDENTIFICATION

RELATED APPLICATIONS

This application is a continuation of U.S. application Ser. No. 15/498,267 entitled "System and Method for Performing Production Line Product Identification," filed Apr. 26, 2017. This application incorporates by reference, in its entirety, the following prior patent: U.S. Pat. No. 9,147,326, entitled "Encoder Based Speed Compensated Reject System and Method," filed Jan. 28, 2013. All above identified applications are hereby incorporated by reference in their entireties.

BACKGROUND

The present disclosure relates to a system and method for identifying products in a manufacturing production line.

Foods, medications, dietary supplements and other packaged products processed in a manufacturing facility are typically controlled to ensure consumer safety. The dangers in manufactured products include various forms of contamination and distribution of incorrect product. In some cases, when contamination of a product is identified, that particular product may have to be recalled and/or removed from production in order to ensure safety of those who consume the product. In addition, sometimes mismatched products that do not correspond to the product being processed on a production or packaging line may get mixed up with the product being processed or packaged, which can lead to errors in product deliveries to consumers.

In some cases, manufacturers can use computerized systems to identify the products on the production line based on an identification code such as a Universal Product Code (UPC). However, such computerized systems may rely on capturing a full UPC code or other identification markings in order to positively identify the product. In some instances where the products being processed on a manufacturing line have a uniform shape (e.g., rectangular) and orientation relative to a UPC detection device may be relatively uniform. However, a single manufacturing line in a production facility may process many types of products having a variety of packaging shapes that can result in various aspects and orientations of the packaging being presented to the UPC detection device, which can result in a partial UPC or no UPC being presented to the UPC detection device.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, a system for identifying products on a production line includes a conveyor that transports containers of products along a production line that includes an inspection location including multiple cameras configured to obtain images of the containers at the inspection location from various positions and orientation angles. A controller receives the images captured by the cameras at the inspection location and detect features of a label on the packaging of the containers that can include at least a portion of a barcode, brand and product logos, ingredient lists, or nutrition information. If the full barcode is not visible in the images captured by the camera, the controller can identify the product associated with a given container based on the features that are visible in the images. In addition, the product can be identified based on the detected features in the images even if no portion of the barcode is present. The controller calculates a quality score for the images obtained by each of the cameras and uses the image with the highest quality score to identify the product based on stored product pattern data. If the detected features match the pattern data for the product that is currently being processed on the production line, then the item is allowed to pass. If, however, the detected features do not match the pattern data, either due to a mismatch condition where an incorrect item is identified or a no match condition where neither the correct item nor an incorrect item are identified, then the controller may actuate a rejection device that diverts the item away from the production line. In some implementations, a predetermined number of items having a no match condition are allowed to pass on the production line before actuation of the rejection device.

Benefits of the system include being able to identify products on high volume production lines where the containers may be touching each other, causing portions or all of the barcode and label to be obscured from view of the cameras. In addition, containers having cylindrical or rounded shapes can still be identified by the system even if a portion or all of the barcode to be obscured from view of one or more of the cameras. Using a combination of features to identify the products improves the accuracy and speed of product detection and allows the products to be identified even if a barcode is not captured in the images by the cameras.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
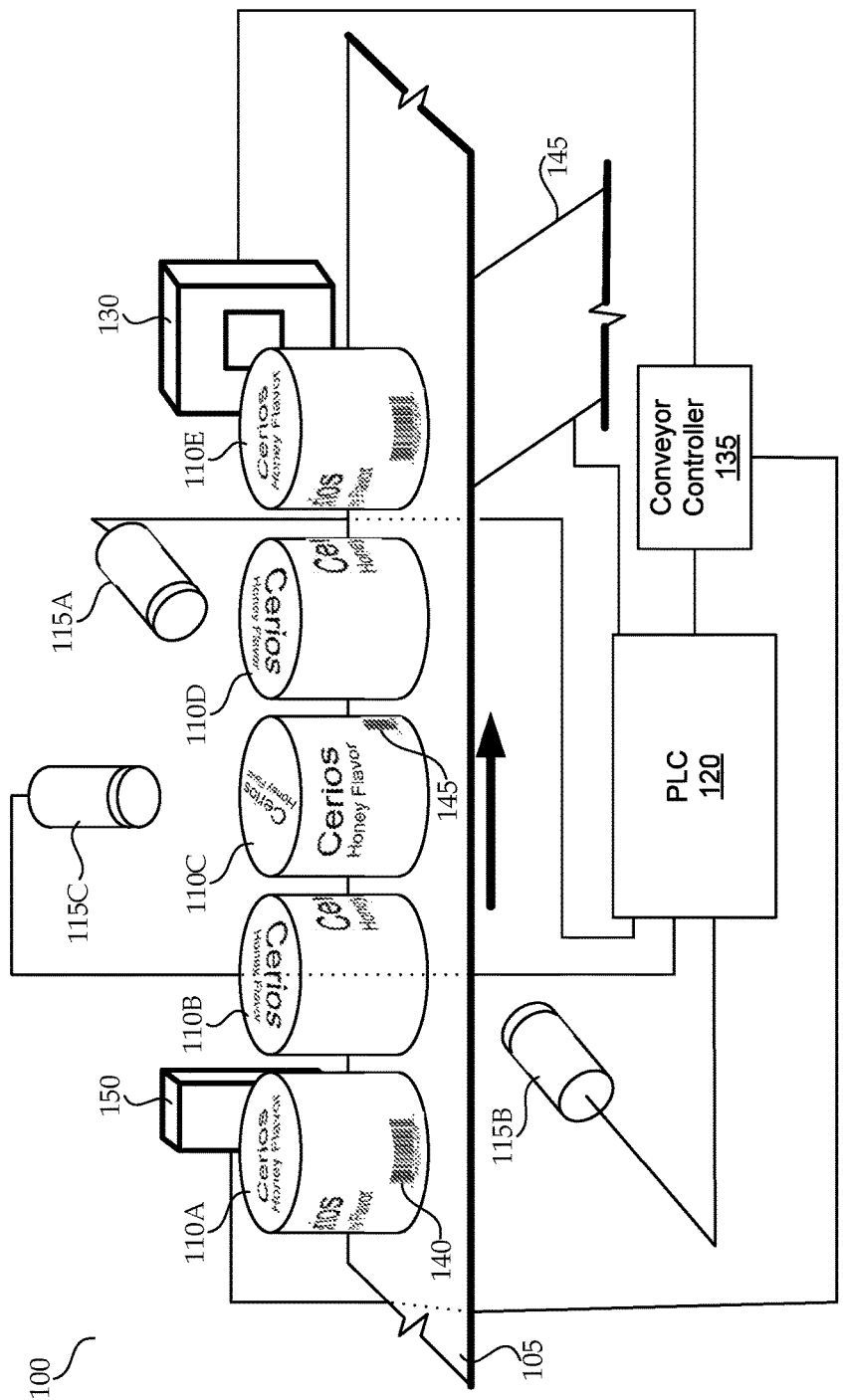
FIG. 1 illustrates an exemplary product identification system.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to identifying products on a manufacturing line that can be configured to process a wide variety of products for manufacturing and packaging. When items such as foods, medications, dietary supplements and similar products are manufactured and packaged, it may be necessary to inspect the products (or their packaging/container) to ensure that the correct product is packaged, shipped and, ultimately, used or consumed by the purchasers of the products. When an incorrect item is identified in the production or packaging process, it may be appropriate to reject the incorrect item by, for example, ejecting or diverting the item from the production line. In some implementations, cameras are configured on the manufacturing line to capture images of the products that are used to positively identify the products based on a detected barcode or other unique identification code.

Manufacturing production lines are very often configured to process a wide variety of products that come in a wide variety of shapes and sizes, which makes positively identifying the products based on a barcode alone more difficult because the high density of products on the production line along with the shape of product packaging may obscure some or all of the barcode from view. In the implementations described further herein, the system can determine whether all of a barcode for a product is visible in a captured image of a product on the production line. If the full barcode is not visible then a captured image or if none of the barcode is present in the captured image, then the system can use a combination of features detected in images of the product to identify the product. Using a combination of barcode and feature detection to identify products on the production line improves accuracy rates of product identification and also improves overall processing efficiency since the system does not have to wait for an image of a full barcode to identify the product.

FIG. 1 illustrates a system 100 for identifying products according to certain embodiments of the present disclosure. The system 100 may be used to identify products (such as items 110, for example) transported by conveyor 105 past at least one predetermined inspection location. In some implementations, the items 110 may be associated with a particular product that is being packaged for shipment to a customer on a manufacturing line. For example, inspection of products (or product packaging/containers) may take place in a manufacturing process as an in-line operation while, in other embodiments, inspection of products may take place during packaging or boxing of finished products. In some implementations, the items 110 may be identical packages of a type of food, drug, or other type of product. Although only five items 110 are illustrated in FIG. 1, it can be understood that a typical production line processes a continuous stream of items like those illustrated as items 110. The system 100 may be configured to identify the items 110 to ensure that the correct products have been processed and packaged for a customer. In some implementations, the items 110 may be packaged in boxes, jars, tubes, tubs, or any type of container that can have a variety of shapes and sizes. As illustrated in FIG. 1, conveyor 105 transports the items 110 from left to right.

At the inspection location (the approximate position of item 110C), the system 100 may include one or more cameras 115 positioned to capture images or video of the items as they pass the predetermined inspection location on conveyor 105. Although three cameras are shown in FIG. 1, some implementations may include additional cameras, while other embodiments may only have one or two cameras. The number of cameras, in some examples, may be determined based on one or more of a number of sides of the product packaging, number of sides of the product packaging including identifying information, size of the product, density of the product on the conveyor 105 (e.g., if more than 1 item may be side-by-side), etc. For example, some product items may not have useful identification information on a top surface, so camera 115C may not be used to identify such items.

In some implementations, the number of cameras 115 included in the system 100 may be based on feature capture angle ranges of each of the cameras 115 for the items 110 that are processed by the system 100. In addition, the system 100 can activate and/or deactivate one or more cameras 115 of the system 100 based on the feature capture angle ranges. The feature capture angle ranges may correspond to a range of rotational degrees that each camera is able to capture a feature for a particular item 110, which can be based on characteristics of the cameras 115 (e.g., camera orientation/ aspect angle, distance of camera from the item, etc.) as well as dimensions of the packaging of the items 110 and features of a label on an outer surface that is used to identify the items 110.

For example, the items 110 can include a cylindrically shaped package such as a soup can, condiment jar, yogurt container, or single serving cereal bowl that may have a label affixed to one or more outer surfaces of the items 110 that distinguish the items 110 from other products. In one implementation, the label is made of a flexible material (e.g., paper, flexible plastic) that is wrapped around an outer rounded surface of the items 110. In other implementations, the label may be printed or stamped on the outer surface of the items 110. The label for the items 110 may include a number of identifying features that can be used by the system 100 to distinguish the items 110 from other products. The identifying features can include a barcode 140, matrix or 2D barcode, QR code, or any type of identification code that distinguishes the item 110 from other types of products such as a universal product code (UPC), brand and/or product logos, ingredient lists, nutrition information, quantity information, and any other information included on the label. In circumstances involving cylindrical or rounded shape packaging causing partial obscuring of an affixed label, the cameras 115 may be able to capture a particular feature on the label for a predetermined number of degrees of rotation of the item 110.

In some implementations, the number of cameras 115 that are used to identify the items is based on how many degrees of rotation a particular camera 115 is able to capture a full or complete barcode 140 on the label. As the items 110 are transported by the conveyor 105, a rotational orientation of the items 110 with respect to each of the cameras 115 may be (or become) essentially random due to a randomized nature of how the items 110 are placed on the conveyor, contact between the items 110 on the conveyor 105 that causes rotational shifting of the items 110, and the like. For example, items 110A-110C are shown in a variety of different rotational orientations with respect to the cameras 115. In some embodiments, such as those exemplified in FIG. 1, the spacing of items on conveyor 105 may be minimized to achieve a high production throughput. In some embodiments, the production throughput, for example, may exceed 500 items per minute (<120 ms per item). In some embodiments, the items on conveyor 105 may be touching or in very close proximity to one another. Under such conditions, the barcodes 140 on some items 110 (such as item 110C, for example) may be hidden from view of the any of the cameras 115. For example, only a part of barcode 145 on item 110C may be visible to any of the cameras 115.

In one example where the system 100 includes four cameras 115, each camera may capture the full barcode 140 for the each of the items 110 over 70 degrees of rotation of the individual item 110. Therefore, the cameras 115 can be positioned to capture the full barcode of the items 110 over 280 degrees of rotation of the item 110, and the captured barcode 140 can be used by the system 100 to identify the item 110. For the remaining 80 degrees of rotation, the cameras 115 can capture a partial barcode and/or other features of the label affixed to the packaging of the item 110, which can be used by the system 110 to identify the item 110. Because the types of items 110 processed by the system 100 have packaging shapes and sizes, label features, and barcodes, each type of item 110 may have different ranges over which the barcode 140 and other features may be captured. For example, another type of product, such as a yogurt container, may have a barcode that is rotated 90 degrees from the barcode 140 shown on the items 110 in FIG. 1. The rotated barcode may result in a greater range of orientation angles over which a full barcode may be captured by the cameras 115, which can result in a lower number of cameras being used by the system 100 to capture images used to identify the items 110. In addition, other design characteristics of the labels of the items 110 may affect the number of cameras 115 that are used to identify the product. For example, the graphical features of a single serving cereal bowl label may be more easily identified in the captured images than the graphical features of a soup can label, which can result in only two cameras 115 being configured to capture images when single serving cereal bowls are being processed by the system 100 while a greater number of cameras 115 may be used to capture images of the soup cans.

In some implementations, the system 100 can adaptively configure the number of cameras 115 that are activated to capture images of the items 110 based on characteristics of the labels affixed to the items 110 being transported by the conveyor 105. By adaptively determining the number of cameras that are used by the system 100, power savings can be achieved by powering down the cameras 115 that are not in use or putting the cameras 115 that are not in use into a sleep mode. In addition, using fewer cameras 115 to acquire images of the items 110 reduces a processing load on the PLC 120 or other processors associated with the system 100, which can cause a greater number of items to be processed by the system 100 in a shorter period of time. Because of the high production throughput (>500 items per minute) through the system 100, in some embodiments, the process of identifying a product may be required to be completed in less than, for example, 120 ms. Therefore, reducing the number of acquired images for processing can result in improved processing times. In addition, the system 100 can automatically control an orientation angle and position of the cameras 115 based on the number of cameras 115 being used. The use of the term "camera" herein is not intended to be limiting. Any type of area or line scan image capture device, including still cameras, video cameras, line scan cameras and the like may be used as an application demands.

In some implementations, the system logs a timestamp of item information capture. The system 100 may determine, for example, that an item 110 has reached the inspection location based on a speed of conveyor 105 and a time at which the item 110 is detected by sensor 150.

Figure 2:
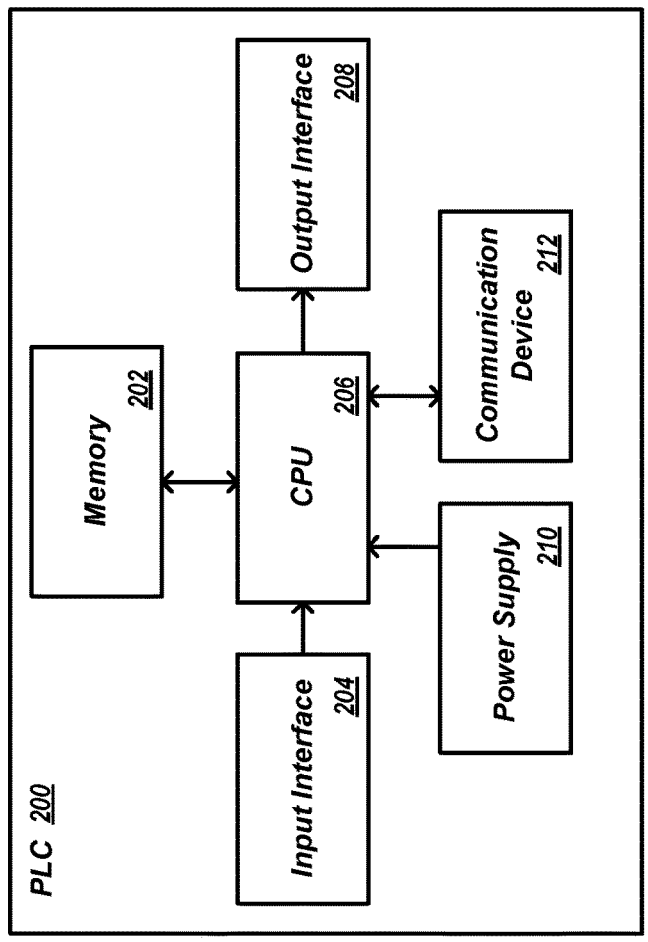
FIG. 2 illustrates an exemplary block diagram of a programmable logic controller (PLC)

The images captured by cameras 115 may be fed into programmable logic controller (PLC) 120 that executes one or more software processes associated with the system 100 and outputs control signals to other controllers and electronically-activated components of the system 100. One example of a suitable PLC for the system 100 is an Allen Bradley PLC. As an illustrative example, FIG. 2 provides a simplified hardware block diagram of a PLC 200, which can be implemented as the PLC 120 in the system 100. The description of the PLC 200 is not meant to be limiting, and can include other components than those described herein. The PLC 200 may include a central processing unit (CPU) 206 that executes one or more software processes associated with the system 100. Software instructions for the processes can be stored in memory 202. The memory 202 can include both volatile and non-volatile memory and can store various types of data associated with executing the processes related to capturing images of items 110 on the conveyor and identifying the product based on the captured images. The PLC 200 includes an input interface 204 for connecting to various devices that provide inputs to the PLC 200 such as the cameras 115, conveyor 105, rejection conveyor 145, conveyor controller 135, sensor 150, rejection device 130, and any other device associated with the system 100. The PLC 200 also includes an output interface for connecting and providing control signals to any device controlled by the PLC 200 including the cameras 115, rejection conveyor 145, conveyor controller 135, rejection device 130, and any other device controlled by the PLC 200. The PLC 200 also includes a power supply 210 as well as a communication device 212 that allows the PLC 200 a wired or wireless communication interface between the PLC 200 and any other device of the system 100 or other systems.

Referring back to FIG. 1, in some implementations, the PLC 120 can output data and control signals to conveyor controller 125, which controls operation of conveyor 105 and rejection line conveyor 145, which can include starting and/or stopping conveyors 105 or 145 or adjusting the speed or direction of the conveyors 105 or 145. The functions and operations performed by the conveyor controller 135 can also be integrated into functions performed by the PLC 120.

The PLC 120 may also control the acquisition of images by cameras 115 by, for example, controlling a precise time for image capture. The PLC 120 may also control other parameters of cameras 115 such as focus, aperture, white balance, exposure/shutter speed, etc. The PLC 120 can also power down (or put into sleep mode) any cameras that are not being used to capture images of a particular item 110 or activate and configure for use any additional cameras. In some embodiments, sensor 150 may provide an advance indication for a times at which a product will reach the inspection location. In other embodiments, cameras 115 may capture a continuous sequence of images (a video sequence, for example), and the PLC 120 may select the most appropriate image for each item as it passes the inspection location. In some embodiments, sensor 150 may be an optical sensor that may employ a light emitter and photo sensor that detects the presence of an item on the conveyor 105. In other embodiments, sensor 150 may be an ultrasonic sensor that may employ an ultrasonic emitter and ultrasonic sensor that detects the presence of an item on the conveyor 105. In yet other embodiments, sensor 150 may employ two devices (a light emitter and photo sensor, for example), one on either side of conveyor 105, to sense the passing of an item. In another embodiment, the products on conveyor 105 may include radio frequency identification (RFID) tags. In such an embodiment, sensor 150 may include RFID detection circuitry.

In some implementations, the PLC 120 configures one or more of the cameras to acquire images of the items 110 based on the type of product being processed by the system 100. For example, the PLC 120 can store various types of data in memory that can be used to determine how to configure the cameras 115 to acquire images of a particular product. The data that is used to determine the number, position, and orientation of the cameras 115 of the system can be determined based on stored packaging pattern data that can include label templates for various types of products processed by the system 100, product identification data that includes unique identification codes for each of the items that may correspond to the UPC or another type of unique identifier, production schedule data that includes times that various types of products are scheduled to be processed by the system 100, and camera configuration data that indicates a current status of each of the cameras 115 with respect to position, orientation angle, and the like.

The PLC 120 may process images from cameras 115 to identify indicia or unique features on each item 110 that correspond to the packaging pattern data to positively identify the item 110 whose image is captured by the cameras 115 and determine whether the item 110 corresponds to a type of item currently being processed. In some implementations, the PLC 120 determines a quality score for each of the images captured by the cameras 115. The quality score provides an indication of how well the features in a captured image can be used to positively identify the item 110. The quality score may correspond to a value in any range of values, such as 0 to 10, 0 to 100, 0 to 1000, or any other range.

In some implementations, if a calculated quality score is greater than a predetermined threshold, then the PLC 120 may determine that a captured image corresponds to a particular product. In addition, images having quality scores less than a second predetermined threshold may be considered as having too few features to be able to accurately recognize a type of product and thus any image having a quality score less than the second predetermined threshold is discarded. The PLC 120 may also identify the item 110 based on a relative quality score that provides an indication of how well the captured image represents a particular product versus any other product that is processed by the system 100. For example, an item 110 with a low relative quality score can indicate that the features detected in the image indicate correspondence to two or more different products within a predetermined range of similarity. On the other hand, an item having a high relative quality score can indicate that the features detected in the image are strongly associated with one product as opposed to any other product processed by the system 100.

In addition, the quality score for each image may be represented by either a percentage or raw score. As a percentage, the quality score indicates what percentage of the image includes detectable features of the item 110 that can be used to distinguish the item 110 from other products that are processed by the system 100. In other examples, the percentage quality score indicates a percentage of the container for the item 110 that has been captured by the image. For example, an image where an entire container of the image 110 is captured may have a higher percentage quality score than an image where only a portion of the container is captured. In implementations where the quality score is represented by a raw score, the score may represent a number of detectable features of the item 110 that can be used to distinguish the item 110 from other products that are processed by the system 100.

In some examples, if a full barcode 140 is captured in an image, that particular image receives a highest possible quality score in the given range. In examples where the captured images include a partial barcode or no barcode, the quality score may be calculated to indicate a number or percentage of features that are detected in the image that can be used to identify the item 110. For example, the detected features can include full or partial product or company logos, nutrition information, ingredient list, quantity information, or any other image features. In some implementations, the product can be positively identified based on the detected features even if no barcode is present in the image. Once the quality scores have been determined for all of the captured images of an item 110, the PLC 120 selects the image with the highest quality score to be compared to packaging patterns of products stored in memory of the PLC 120. The PLC 120 may use any type of image processing and/or pattern recognition algorithm that is known to compare the image with the highest quality score to the stored packaging patterns. For example, the PLC 120 can use edge detection, background subtraction, or frame differencing algorithms to locate the items 110 within the image. Because the cameras 115 capture images of the items 110 in a relatively static environment with consistent lighting, less robust object detection can be used to locate the items 110 within the image. For example, frame differencing provides highly accurate object detection results in a relatively static environment with low processing time. Meanwhile, template matching object detection algorithms provide highly accurate results but also may have high processing times. In some examples, the processing time for template matching can be reduced by identifying selected features/indicia of a pattern template for a product that distinguish a given product from other products processed by the system and comparing the selected features to detected features in the images captured by the cameras 115. In some implementations, the selected features can include particular color patterns at various locations in the image, detection of various shape patterns in the images, and alignment of the various components of an item label within an image. The templates that are compared to the items 110 detected in the images may be represented by eigenvectors that can be compared to vector representations of the item features or portions of item features detected in the images. If the identified product for the item 110 matches the product that is currently being processed by the system 100, resulting in a match condition, then the item 110 is allowed to continue on the conveyor 105. If, however, a match condition does not occur for an item 110, then the item may be diverted onto rejection conveyor 145 by rejection device 130.

In some examples, when a match condition does not occur, then the item 110 may have been matched to another product that does not correspond to the product currently being processed by the system, resulting in a mismatch condition. In some aspects, if a mismatch condition is detected, then the mismatched item is diverted onto the rejection conveyor 145 by the rejection device 130, and a lockout of the system 100 may occur in which the conveyor 105 is shut down until a lockout clearing process is performed. In some implementations, the lockout clearing process may include authentication of an authorized user with a RFID key and/or password who clears the lockout and restarts the system 100 after investigation into the cause of the mismatch condition. In other examples, if a match condition does not occur, then the item 110 may not have been matched to the correct product nor an incorrect product, resulting in a no match condition. The no match condition may occur in situations where the images captured by the cameras 115 do not include enough detectable features to positively identify the item 110. The no match condition may also occur when one or more of the cameras 115 may have malfunctioned or failed. In some examples, a predetermined number of items 110 may be allowed to pass on the conveyor 105 before the non-matched item is diverted onto the rejection conveyor 145 by the rejection device 130 and/or the system lockout occurs.

The system 100 may also include a rejection device 130 and corresponding rejection conveyor 145 that may be configured to eject or divert a specific item from conveyor 105 under the control of controller 125. In some implementations, if the PLC 120 determines that the item 110E identified on the conveyor 105 does not correspond to the type of item currently being processed, the PLC 120 can issue a control signal to the rejection device 130 to divert the item 110E onto the rejection conveyor 145 and away from the path provided by the conveyor 105. The rejection device 130 can be any type of device that can either directly make contact or cause another object to make contact with the item 110E in order to cause the item 110E to move off the conveyor 105 and onto the rejection conveyor 145. In some implementations, the rejection device 130 may be an arm, blade, pusher, stepper motor, servo motor, air cylinder, pneumatic blow-off, or other device. The type of rejection device 130 that is used to divert the item 110E off the conveyor 105 may be based on a type of packaging of the item 110E. For example, gentler rejection devices such as the stepper motor, servo motor, or pusher may be used to divert breakable or deformable items that may be packaged in glass or another type of breakable or highly malleable material. Similarly, lighter items that are unbreakable may be blown off the conveyor 105 and onto the rejection conveyor 145 with the air cylinder or pneumatic blow-off. In some implementations, the PLC 120 can also activate an alarm or other type of alert mechanism when an item is diverted onto the rejection conveyor 145 in response to a detection of a product mismatch or no match condition. The alarm can include any type of audio or visual indication that alerts a user that a product mismatch or no match condition was detected, and the corresponding item was diverted off the conveyor 105 and onto the rejection conveyor 145. Examples of alarms include any combination of an audible tone or spoken alarming condition message, a blinking light or other type of visual indication, and a product message output report to a computer log or messaging system that can provide text messages, emails, or other types of messages to system users indicating that a product mismatch or no match condition was detected. In some examples, when a predetermined number of product mismatches or no matches are detected within a predetermined period of time, the PLC 120 may shutdown the conveyor 105 until a user verifies that the correct products are being processed by the system 100 and resets the PLC 120 to clear the alarming condition.

The system 100 illustrated in FIG. 1 provides a simplified arrangement of a product inspection system according to some embodiments of the present disclosure for the sake of clarity. Other components that may be useful for some embodiments described in the present disclosure are not illustrated in FIG. 1. These include, but are not limited to, lighting, support structures, conveyor drive, camera control equipment, etc. For example, to capture appropriate images of the bar code 140 or other identifying indicia, the lighting may be adjusted to avoid glare/reflection/oversaturation of the image, etc.

Figure 3:
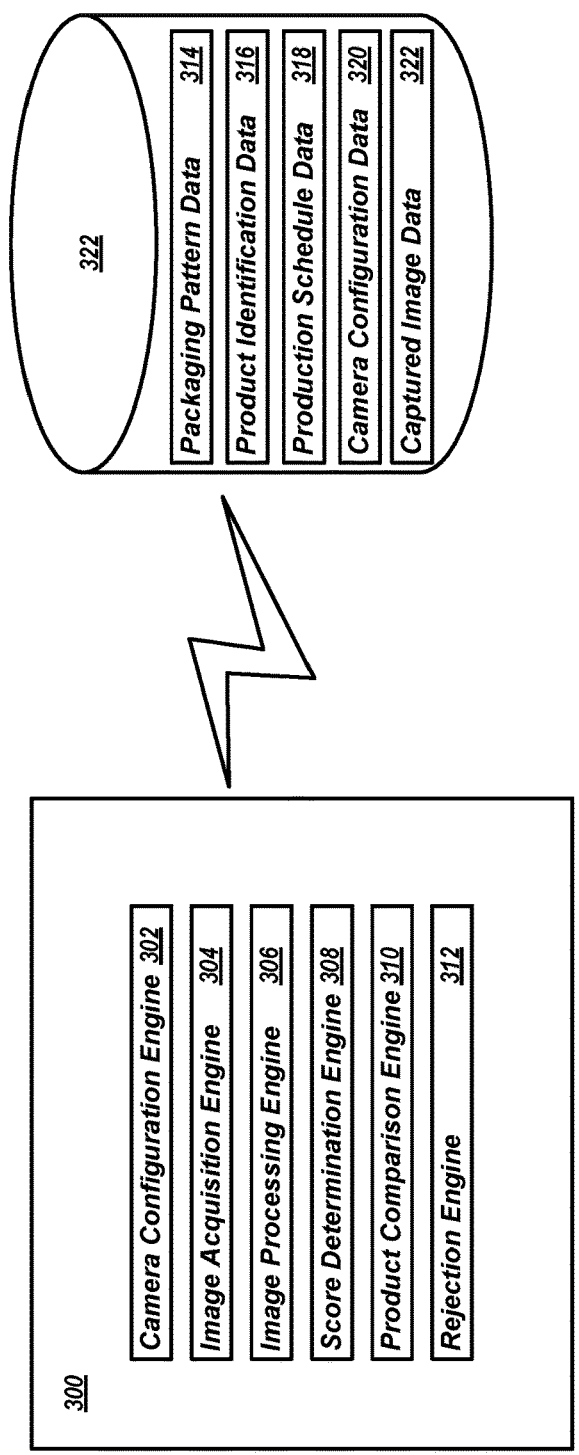
FIG. 3 illustrates an exemplary block diagram of types of data and processes executed by the PLC.

Turning to FIG. 3, an alternative data processing and storage configuration for the system 100 is presented. In some implementations, the software processes associated with the system 100 can be executed by processing resources such as servers, database servers, or any other type of processing resources including cloud-based computing resources. For example, processing system 300 is associated with and connected to the system 100 and can include one or more engines or modules that perform processes associated with identifying products transported by the conveyor 105 of the system 100. In some implementations, the processing system 300 can connect to the system 100 via a wired or wireless connection. References to the engines or modules throughout the disclosure are meant to refer to software processes executed by circuitry of one or more processing circuits, which can also be referred to interchangeably as processing circuitry. The processes executed by the processing system 300 correspond to processes that may be executed by the PLC 120 of the system 100 described above in FIG. 1.

For example, the processing system 300 includes a camera configuration engine 302 that configures the cameras 115 of the system 100 based on the type of product being processed by the system 100. In some implementations, the camera configuration engine 302 can adaptively configure the number of cameras 115 that are activated to capture images of the items 110 based on characteristics of the labels affixed to the items 110 being transported by the conveyor 105. For example, the camera configuration engine 302 can activate and/or deactivate one or more cameras 115 of the system 100 based on the feature capture angle ranges. The feature capture angle ranges may correspond to a range of rotational degrees that each camera is able to capture a feature for a particular item 110, which can be based on characteristics of the cameras 115 (e.g., camera orientation/aspect angle, distance of camera from the item, etc.) as well as dimensions of the packaging of the items 110 and features of a label on an outer surface that is used to identify the items 110. In one example where the system 100 includes four cameras 115, each camera may capture the full barcode 140 for the each of the items 110 over 70 degrees of rotation of the individual item 110. Therefore, the cameras 115 can be positioned to capture the full barcode of the items 110 over 280 degrees of rotation of the item 110, and the captured barcode 140 can be used by the system 100 to identify the item 110. For the remaining 80 degrees of rotation, the cameras 115 can capture a partial barcode and/or other features of the label affixed to the packaging of the item 110, which can be used by the system 110 to identify the item 110 even when some or none of the barcode is present in the captured images. The camera configuration engine 302 may also control other parameters of cameras 115 such as focus, aperture, white balance, exposure/shutter speed, etc. The camera configuration engine 302 can also power down (or put into sleep mode) any cameras that are not being used to capture images of a particular item 110.

The processing system 300 also includes an image acquisition engine 304 that acquires the images captured by the cameras 115. In some implementations, the image acquisition engine 304 outputs a control signal to the cameras 115 to capture one or more images of the items 110 based on sensor data received from sensor 150 indicating a position of the items 110 on the conveyor 105. The image acquisition engine 304 receives the images from each of the cameras 115 and annotates captured image data 322 for each of the images with the particular camera 115 that captured the image along with configuration parameters for that particular camera 115.

The processing system 300 also includes an image processing engine 306 that detects features of the images that can be used to identify the type of product being transported on the conveyor 105. In some implementations, the features can include any identifying marks that are visible on an outer surface of the products and may include a barcode, brand and/or product logos, ingredient lists, nutrition information, quantity information, and any other information included on the label. The image processing engine 306 can use any image processing algorithms that are known to detect the features of the images. The features can include patterns, colors, sizes, shapes, and locations of various objects that are detected on the label of the product.

The processing system 300 also includes a score determination engine 308 that calculates a quality score for each of the captured images. The quality score provides an indication of how well the features in a captured image can be used to positively identify the item 110. The quality score may correspond to a value in any range of values, such as 0 to 10, 0 to 100, 0 to 1000, or any other range. In some examples, if a full barcode 140 is captured in an image, that particular image receives a highest possible score in the range. In examples where the captured images include a partial barcode or no barcode, the quality score may be calculated to indicate a number or percentage of features that are detected in the image that can be used to identify the item 110. For example, the detected features can include full or partial product or company logos, nutrition information, ingredient list, quantity information, or any other image features. Once the quality scores have been determined for all of the captured images of an item 110, the score determination engine 308 selects the image with the highest quality score to be compared to packaging pattern data 314 stored in data repository 322.

The processing system 300 also includes a product comparison engine 312 that compares the image with the highest quality score to the packaging pattern data 314 for all possible products that are manufactured on a production line or at a manufacturing facility. The product comparison engine 312 may use any type of image processing and/or pattern recognition algorithm that is known to compare the image with the highest quality score to the packaging pattern data 314. In some implementations, key feature points are identified in the captured image, which are compared to key feature points in the stored packaging patterns. If the identified product for the item 110 matches the product that is currently being processed by the system 100, then the item 110 is allowed to continue on the conveyor 105. Degree of certainty in match, for example, may be required to be at least 95%, 99%, or 100%. If, however, the identified product does not correspond to the product currently being processed by the system 100, then the item is diverted onto rejection conveyor 145 by rejection device 130. For example, if degree of certainty in match is less than a threshold amount, such as less than 95% certainty, the item may be rejected or classified as a non-match to a particular product. Conversely, if the system generates a positive match (e.g., meeting or exceeding a threshold of certainty) for a different product than the anticipated product, corresponding to a mismatch condition, the system 100 may divert the item onto the rejection conveyor 145.

The processing system 300 also includes a rejection engine 312 that controls the diversion of rejected items onto the rejection conveyor 145 in response to detection of a product mismatch condition or no match condition by the product comparison engine 310. The system 100 may also include a rejection device 130 and corresponding rejection conveyor 145 that may be configured to eject or divert a specific item from conveyor 105 under the control of controller 125. In some implementations, if the product comparison engine 310 determines that an item identified on the conveyor 105 does not correspond to the type of item currently being processed, the rejection engine 312 can issue a control signal to the rejection device 130 to divert the item onto the rejection conveyor 145 and away from the path provided by the conveyor 105. The rejection device 130 can be any type of device that can either directly make contact or cause another object to make contact with the rejected item in order to cause the item to move off the conveyor 105 and onto the rejection conveyor 145. In some implementations, the rejection device 130 may be an arm, blade, pusher, stepper motor, servo motor, air cylinder, pneumatic blow-off, or other device. In some implementations, the rejection engine 312 can also activate an alarm or other type of alert mechanism when an item is diverted onto the rejection conveyor 145 in response to a detection of a product mismatch or no match condition.

Further, in some embodiments, the rejection engine 312 may confirm redirection of the product onto the rejection conveyor 145. An additional sensor, for example, may identify that a new item has been added to the rejection conveyor 145.

In some implementations, the processing system 300 is connected to data repository 322 via a wired or wireless connection. The data repository 322 can be configured to store data that is used by the processing engines of the processing system 300 or produced by the processing system 300 during execution of the processes. For example, the data repository 322 can include packaging pattern data 314 that can include label templates for various types of products processed by the system 100, product identification data 316 that includes unique identification codes for each of the items that may correspond to the UPC or another type of unique identifier, production schedule data 318 that includes times that various types of products are scheduled to be processed by the system 100, and camera configuration data 320 that indicates a current status of each of the cameras 115 with respect to position, orientation angle, and the like. The data repository 322 can also include captured image data 322 that can be used as historical data to further refine the packaging pattern data 314 for the products processed by the system 100.

Figure 4:
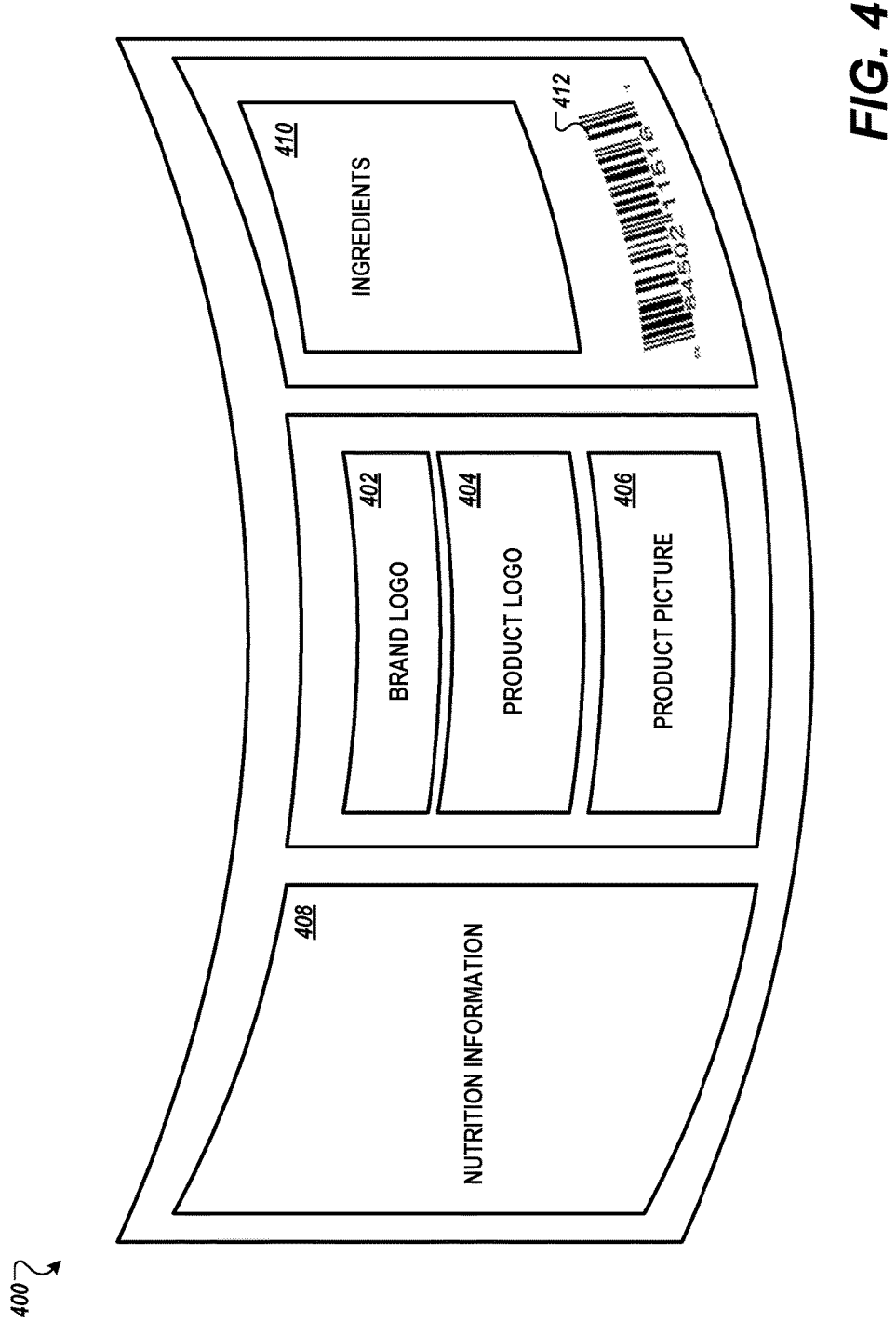
FIG. 4 illustrates an exemplary label for an item.

Turning to FIG. 4, an exemplary label 400 for an item is illustrated. In implementations where the item has a rounded or cylindrical shape, the label 400 may be made of a flexible material (e.g., paper, flexible plastic) that is wrapped around an outer rounded surface of the item. In other implementations, the label 400 may be printed or stamped on the outer surface of the item. The label 400 for the item may include a number of identifying features that can be used by the system 100 to distinguish the item from other products. For example, the features can include a brand logo 402, product logo 404, product picture 406, nutrition information 408, ingredients 410, and barcode 412. In some implementations, the system 100 can identify the item based on the detected features as well as the locations of the features relative to other features on the label 400. Additional features other than those shown in FIG. 4 can also be included on the label 400, which may also be used to identify the product, such as inspection stickers, quantity information, cooking directions, etc.

Figure 5A:
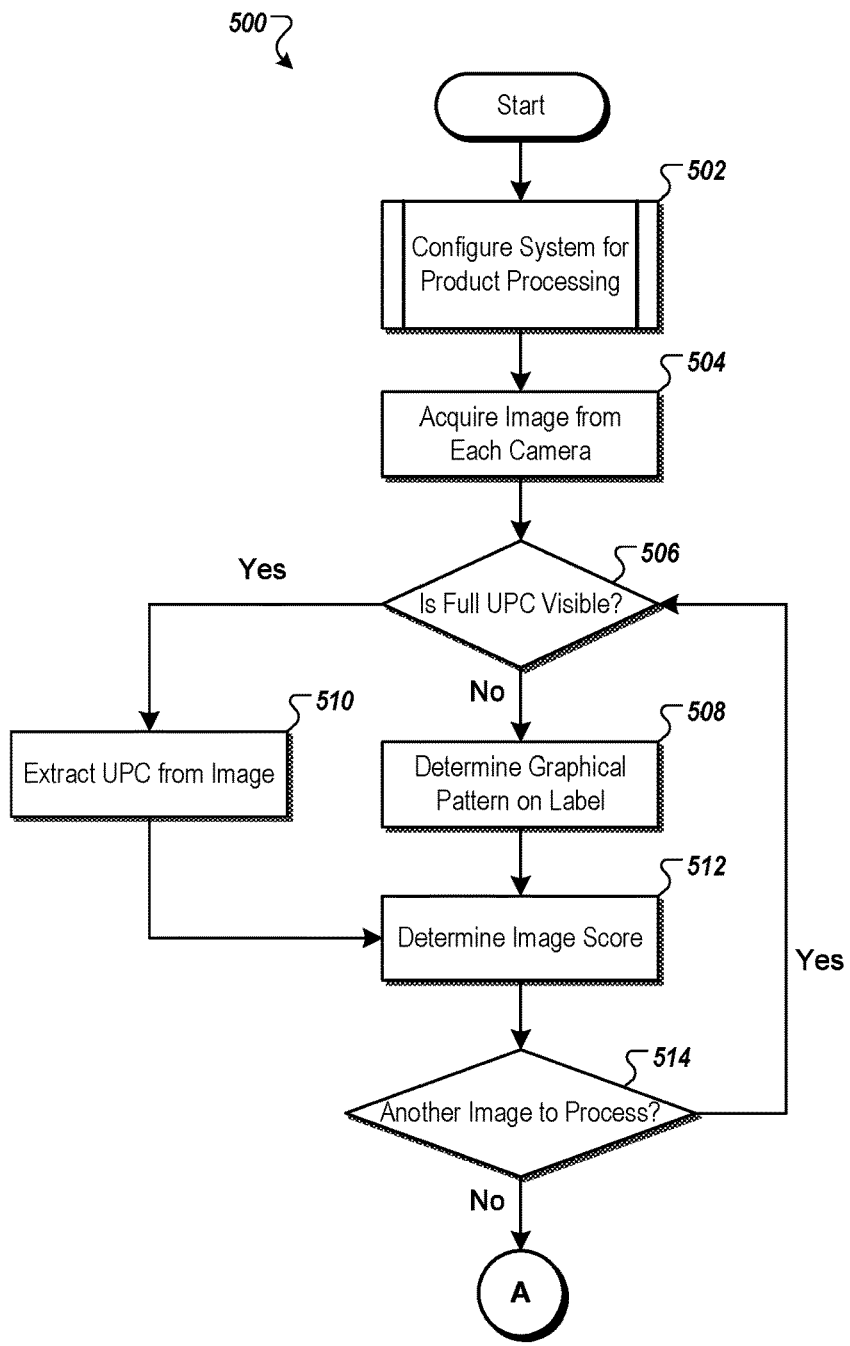
FIGS. 5A-5B illustrate an exemplary flow diagrams of a product identification process.
Figure 5B:
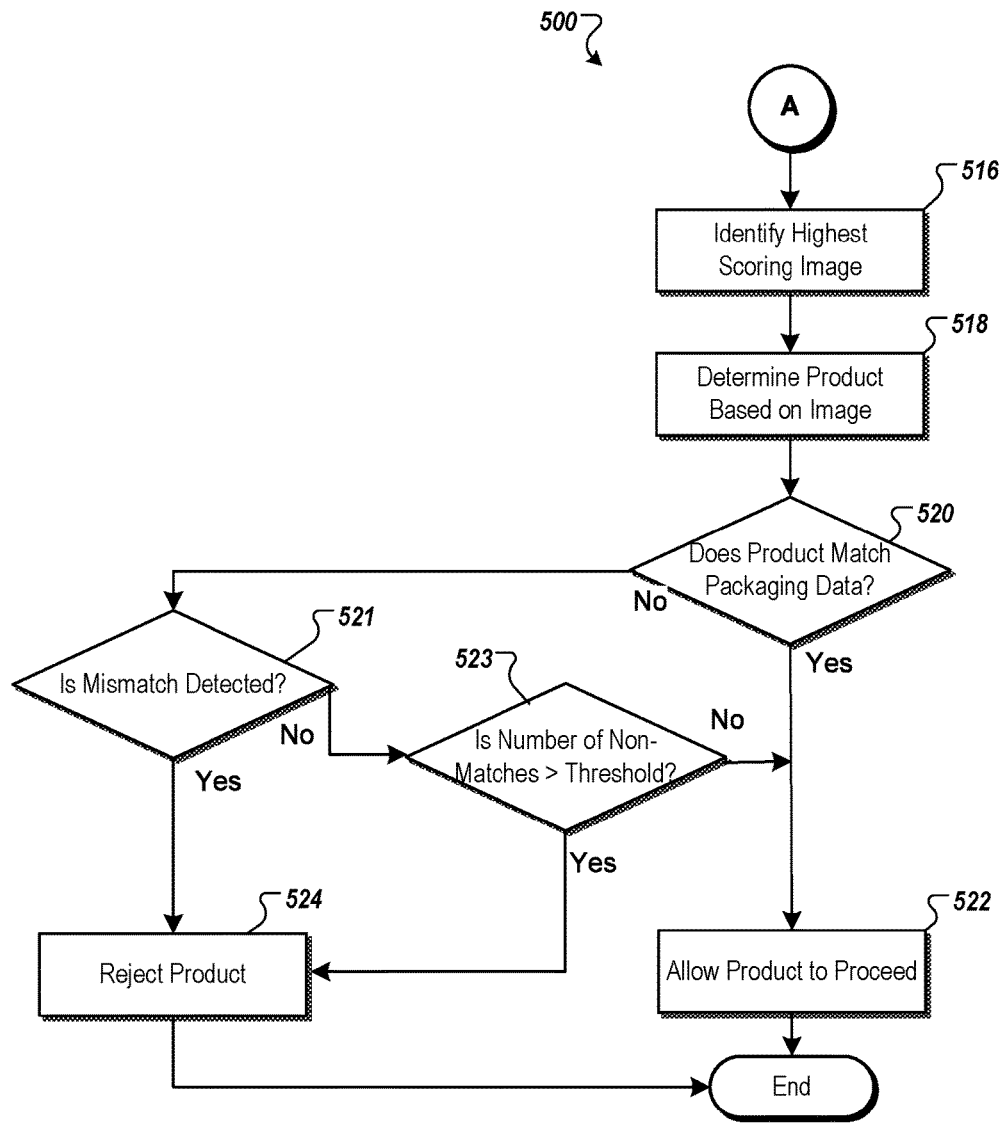

FIGS. 5A and 5B are flow diagrams that schematically illustrate a method 500 of product identification, and processing of the results of the identification, according to some embodiments of the present disclosure. The descriptions for the flow diagrams illustrate a particular ordering of processes, steps, and decision points, but it can be understood that the steps of the processes can be performed in a different order. Additionally, certain steps of the flow diagrams, in other embodiments, may be performed in parallel.

Figure 6:
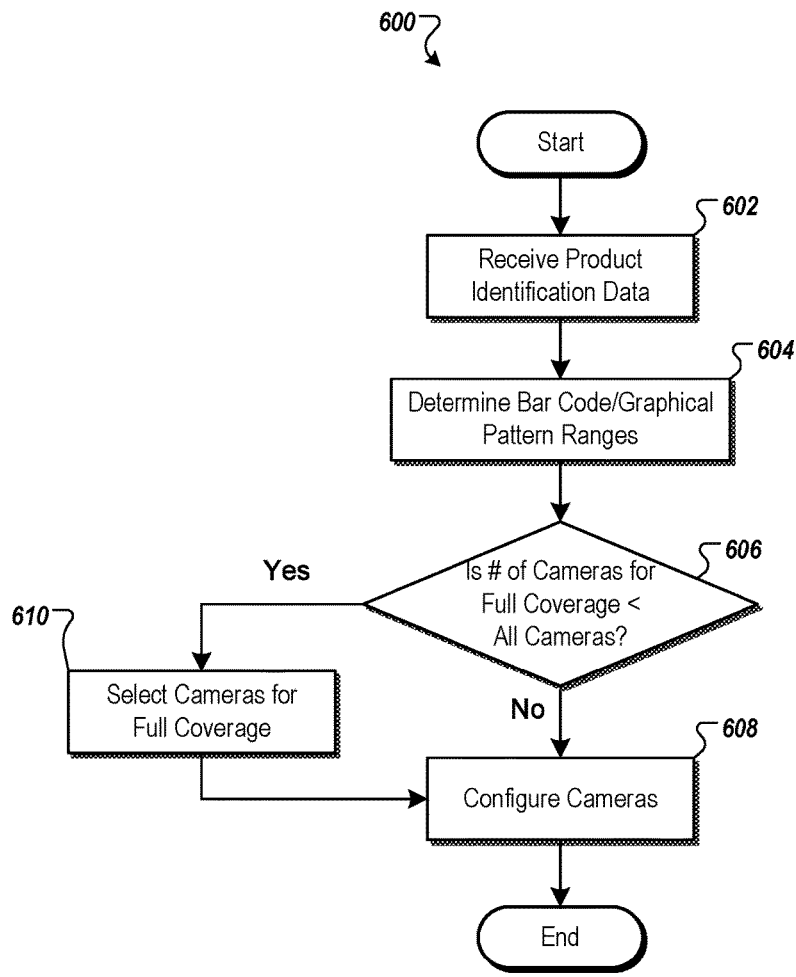
FIG. 6 illustrates an exemplary flow diagram of a system configuration process.

In some implementations, the method 500 begins with configuring a system, such as the system 100 of FIG. 1, for processing a particular product (502). Turning to FIG. 6, a flow diagram of a method 600 for configuring a system is illustrated. Turning to FIG. 6, in some implementations, the method 600 begins with receiving identification data for the product (602) from a sensor (e.g., 150), one or more of cameras (e.g., cameras 115), or a user input indicating that items of the product are being transported by a conveyor (e.g., 105). The identification data can include a UPC or other unique identification code or machine readable indicia, product name, or any other information that can be used to identify the product. In some embodiments, the system 100 can use stored production schedule data to determine the type of product be transported on the conveyor 105.

In response to receiving the product identification data for the product, in some implementations, a number of cameras to activate is determined based on feature capture angle ranges for the product (604). The feature capture angle ranges may correspond to a range of rotational degrees that each camera is able to capture a feature for a particular item, which can be based on characteristics of the cameras (e.g., camera orientation/aspect angle, distance of camera from the item, etc.) as well as dimensions of the packaging of the items and features of a label on an outer surface that is used to identify the items.

If the number of cameras to activate to obtain full coverage of the label on the items by the cameras is less than the total number of cameras connected to the system (608), in some implementations, the cameras to be configured to capture images of the items are selected (610). For example, the PLC 120 of FIG. 1 may select the cameras. The selection, for example, can be based on an orientation of the cameras with respect to one another as well as the characteristics of the packaging and label of the items. The selected cameras may be configured, for example, by outputting control signals to turn on or wake the cameras from a sleep mode if necessary and to modify an orientation angle and/or position of the cameras so that the cameras can capture images that allow for positive identification of the items by the captured images.

Referring back to FIG. 5A, in response to the system being configured for product processing, in some implementations, each of the cameras captures at least one image of an item as the items pass a predetermined inspection location on a conveyor (504). The PLC 120 of FIG. 1, for example, may determine that an item 110 has reached the inspection location based on a speed of conveyor 105 and a time at which the item 110 was detected by the sensor 150.

For each captured image, in some implementations, it is determined whether a full barcode is visible in the image (506). The PLC 120 of FIG. 1, for example, may determine whether the complete barcode is captured within an image. If the full barcode is visible in the image, in some implementations, the barcode is extracted from the image (510). However, if the full barcode is not visible in the image, in some implementations, an image feature pattern is extracted from the image (508). In some embodiments, the image feature pattern includes partial or no barcode as well as partial or full product or company logos, nutrition information, ingredient list, quantity information, color, product shape, information region alignment, or any other image features.

In some implementations, an image quality score is determined based on the detected barcode or image feature pattern (512). For example, the PLC 120 of FIG. 1 may determine a quality score for each of the images captured by the cameras 115. The quality score provides an indication of how well the features in a captured image can be used to positively identify the item 110. The quality score may correspond to a value in any range of values, such as 0 to 10, 0 to 100, 0 to 1000, or any other range. In some examples, if a full barcode 140 is captured in an image, that particular image receives a highest possible score in the range. In examples where the captured images include a partial barcode or no barcode, the quality score may be calculated to indicate a number or percentage of features that are detected in the image that can be used to identify the item 110. For example, the detected features can include full or partial product or company logos, nutrition information, ingredient list, quantity information, or any other image features.

In some implementations, images of an item are processed until all of the images captured by each of the cameras have been processed (514). For example, the PLC 120 of FIG. 1 may continue to process images obtained by each of the cameras and determine quality scores of each image. In some embodiments, a number of images are processed simultaneously in parallel, which reduces a total processing time. In some embodiments, if a quality score matching a particular threshold is reached (e.g., 98/100, 995/1000, etc.) the high quality image may be selected and the remaining images discarded from further processing. For example, to reduce processing cycles and increase speed, upon obtaining an image determined capable of producing a match, the system may cease processing remaining images captured by the cameras.

In some implementations, processing of images may be done on a camera-by-camera (or camera angle by camera angle) basis starting with a camera most likely to capture a positive match. For example, angles capturing sides of packages rather than an upper view of packages may be considered more likely to produce matching product data.

Turning to FIG. 5B, once the quality scores have been determined for all of the captured images of an item (or, conversely, one image or a threshold number of images deemed containing a threshold quality of image are identified), in some implementations, the image with the highest quality score may be identified and selected for comparison to packaging patterns of known products (516). For example, the PLC 120 of FIG. 1 may identify and select one or more images for comparing to packaging patterns stored in memory of the PLC 120.

In some implementations, image processing and/or pattern recognition algorithm(s) are applied to compare the image(s) with the highest quality score(s) to the stored packaging patterns (518). The PLC 120 of FIG. 1, for example, may compare one or more images to stored packaging patterns for all types of products that are processed by the system 100 or in the same manufacturing facility as the system 100. In other embodiments, only packaging patterns associated with the anticipated item are used to identify or discard the item. Because a probability of detecting a product mismatch may be less than a probability of detecting the correct item on the conveyor 105, the PLC 120 may prioritize comparing the highest scoring image to the packaging pattern for the product being processed by the system 100 so that a match is detected before comparisons are performed with packaging patterns for other products. In some embodiments, key feature points are identified in the captured image, which are compared to key feature points in the stored packaging patterns. In some implementations, a match condition is detected when a number or percentage of key feature points detected in the image that correspond to key feature points of a stored product pattern for the product being processed by system 100 is greater than a predetermined threshold, otherwise, a mismatch condition or a no match condition is detected. If, however, the number or percentage of key feature points that correspond between the captured image and a stored product pattern is less than the threshold but greater than the number or percentage of corresponding feature points for any of the other stored product patterns by more than a predetermined amount, the PLC 120 may still detect a match condition.

If the identified product for the item matches the product that is currently being processed by the system (520), in some embodiments, the item is allowed to continue on the conveyor (522). For example, the PLC 120 of FIG. 1 may determine that a particular item 110 may continue on the conveyor 105. If, however, the identified product does not correspond to the product currently being processed by the system, then in some examples, it is determined whether a mismatch condition or a no match condition exists.

A mismatch condition occurs when the item is positively identified as another product which is different from the product which is currently being processed by the system (521). If, in some aspects, the mismatch condition has occurred, then the item is diverted onto a rejection conveyor by a rejection device (524). For example, the conveyor controller 135 of FIG. 1 may divert the particular item 110 onto the rejection conveyor 145. In the event a mismatch condition is detected the PLC may halt the production line and prevent restarting of the production line until a user logs in (authenticates to) the PLC and clears the lockout code.

A no match condition occurs when the container cannot be positively identified. This occurs, for example, when a product label cannot be properly read or when the product label can be read but does not match any product in the PLC memory. In some examples, in the event of a no match condition the conveyor controller 135 of FIG. 1 may divert the particular item 110 onto the rejection conveyor 145. The PLC 120 may keep a running count of "no match" events and when the number of detected no match conditions is greater than a predetermined threshold (523) then the item production line may be halted as described above. However, if the number of detected no match conditions is less than the predetermined threshold, then the PLC 120 of FIG. 1 may simply reject the particular item and allow the production line to continue operating.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:
   a plurality of image capturing devices situated near an inspection location on a continuously moving production line, wherein each of the plurality of image capturing devices is oriented to acquire images of a plurality of items moving along the production line from a different orientation angle;
   a rejection device; and
   a controller communicatively coupled to the plurality of image capturing devices and the rejection device, wherein the controller is configured to, for each item of the plurality of items,
      identify, from a plurality of images of the respective item, the plurality of images comprising at least one image captured from each of the plurality of image capturing devices, a subset of the plurality of images including at least one of a portion of a product identification code and a portion of additional features of the respective item,
      assess quality of each image of the subset of images to identify at least one candidate image portraying one or more features useful for positively identifying the respective item in further analysis, the one or more features including the at least one of the portion of the product identification code and the portion of the additional features of the respective item, apply at least one matching algorithm to the at least one candidate image to determine whether the at least one of the portion of the product identification code and the portion of the additional features matches product information corresponding to the item, and responsive to application of the at least one matching algorithm resulting in no matching product information, cause actuation of the rejection device to remove the item from the production line.

2. The system of claim 1, wherein assessing the quality of each image of the subset of images comprises, after identifying a first candidate image of the at least one candidate image, ceasing to assess the quality of further images of the subset of images, wherein applying the at least one matching algorithm comprises applying the at least one matching algorithm to the first candidate image.

3. The system of claim 1, wherein the plurality of image capturing devices are arranged surrounding the inspection location to obtain images from all vertical sides of each of the plurality of items.

4. The system of claim 1, wherein causing actuation of the rejection device comprises causing actuation of the rejection device to divert the respective item onto a rejection conveyor.

5. The system of claim 1, wherein assessing quality comprises determining a quality score for each of the subset of images of the respective item, wherein each image of the at least one candidate image has a respective quality score at or above a threshold value.

6. The system of claim 5, wherein applying the at least one matching algorithm comprises applying pattern matching to a highest quality image of the respective item having a highest quality score of the subset of images of the respective item.

7. The system of claim 6, wherein applying pattern matching comprises applying the at least one of the portion of the product identification code and the portion of the additional features to a plurality of packaging patterns stored in a non-transitory computer readable memory of the controller, wherein each of the plurality of packaging patterns is associated with a type of item processed on the production line.

8. The system of claim 7, wherein the plurality of packaging patterns comprises one or more templates for labels associated with the types of items processed on the production line, wherein each template of the one or more templates includes at least one of a respective product identification code, a respective brand logo, a respective product logo, a respective ingredient list, respective nutrition information, and respective quantity information.

9. The system of claim 1, wherein the controller is further configured to automatically adjust one or more settings of at least one of the plurality of image capturing devices based on at least one of item size, item shape, label dimensions, and label distribution of the plurality of items.

10. The system of claim 9, wherein automatically adjusting the one or more settings comprises deactivating at least one of the plurality of image capturing devices.

11. The system of claim 9, wherein the one or more settings of the at least one of the plurality of image capturing devices comprises at least one of an orientation aspect angle and a position.

12. A method, comprising:

determining, by a controller, a type of container expected on a continuous production line;

automatically adjusting, by the controller, one or more settings of each image capturing device of one or more of a plurality of image capturing devices to configure each of the one or more image capturing devices to acquire images from a different respective orientation angle, such that a 360-degree rotational range of features of each of a plurality of containers is captured by the plurality of image capturing devices, wherein the one or more settings of each image capturing device of the one or more image capturing devices are based at least in part on the type of container;

acquiring, with the plurality of image capturing devices, images of the plurality of containers moving along the continuous production line;

by the controller for a given container of the plurality of containers, applying a first extraction algorithm configured to extract a machine-readable information code from at least one of the plurality of images of the respective container acquired by the plurality of image capturing devices;

responsive to determining the first extraction algorithm failed to identify the machine-readable information code, applying a second extraction algorithm configured to extract a feature pattern from each of the plurality of images of the respective container;

applying a matching algorithm to the feature pattern of at least one of the plurality of images to match the feature pattern to product information; and responsive to failing to identify a match by the matching algorithm, causing actuation of a rejection device to remove the respective container from the continuous production line.

13. The method of claim 12, wherein automatically adjusting the one or more settings of the one or more image capturing devices comprises automatically adjusting a position of a first image capturing device of the one or more image capturing devices.

14. The method of claim 12, further comprising:

determining, with the controller, a quality score for each of the plurality of images, wherein each respective quality score provides an indication a quality of at least one of the machine-readable information code and the feature pattern.

15. The method of claim 12, wherein applying the matching algorithm comprises matching at least one of a component alignment and a shape pattern with one or more pattern templates representative of product labeling.

16. The method of claim 12, further comprising, responsive to failing to identify a match by the matching algorithm, issuing, by the controller, an alarm.

17. The method of claim 12, further comprising, responsive to failing to identify a match:

determining, by the controller, whether a predetermined number of product mismatches have been identified; and responsive to determining the predetermined number has been identified, causing, by the controller, a conveyor of the continuous production line to halt.

18. The method of claim 12, wherein automatically adjusting the one or more settings of the one or more image capturing devices comprises determining a number of selected image capturing devices of the plurality of image capturing devices based on at least one of a packaging shape of the plurality of containers, a packaging size of the plurality of containers, and label characteristics of the plurality of containers.

19. The method of claim 18, wherein automatically adjusting the one or more settings of the one or more image capturing devices comprises at least one of activating one or more of the number of selected image capturing devices and deactivating one or more unselected image capturing devices of the plurality of image capturing devices.

20. The method of claim 12, wherein each container of at least a portion of the plurality of containers has a cylindrical shape.

* * * * *